United States Patent [19]

Rindal

[11] Patent Number: 4,470,071
[45] Date of Patent: Sep. 4, 1984

[54] TELEVISION SOUND DETECTION SYSTEM USING A FREQUENCY TRANSLATION PHASE-LOCKED LOOP

[75] Inventor: Abraham E. Rindal, Indianapolis, Ind.

[73] Assignee: RCA Corporation, New York, N.Y.

[21] Appl. No.: 412,902

[22] Filed: Aug. 30, 1982

[51] Int. Cl.$^3$ .............................................. H04N 5/62
[52] U.S. Cl. ..................................... 358/198; 358/197
[58] Field of Search ...................... 358/189, 195.1, 196, 358/197, 198, 143, 144; 455/175, 182, 194, 265

[56] References Cited

U.S. PATENT DOCUMENTS 4,419,695  12/1983  Yamamoto ........................... 358/197

FOREIGN PATENT DOCUMENTS

| 2843977 | 4/1980 | Fed. Rep. of Germany | 358/198 |
| 55-134586 | 10/1980 | Japan | 358/198 |
| 56-93490 | 7/1981 | Japan | 358/197 |
| 57-58475 | 4/1982 | Japan | 358/198 |
| 57-68977 | 4/1982 | Japan | 358/197 |

OTHER PUBLICATIONS

"Intercarrier Buzz Phenomena Analysis and Cures" by P. Fockens and C. G. Ellers, published in *IEEE Transactions on Consumer Electronics*, Aug. 1981, pp. 381-397.

Phaselock Techniques by Floyd M. Gardner, published by John Wiley and Sons, Inc. 1966, Chapter 8-4.

*Primary Examiner*—Tommy P. Chin
*Attorney, Agent, or Firm*—Eugene M. Whitacre; Peter M. Emanuel; Lawrence C. Edelman

[57] ABSTRACT

A frequency translation phase-locked loop (PLL) is provided for detecting the audio information from a television signal. A voltage controllable oscillator having a nominal oscillation frequency equal to the frequency difference between the intermediate frequency (IF) picture and sound carriers provides one input to a mixer and a substantially unmodulated picture carrier is supplied as the other input to the mixer. A phase detector has as its first input the output signal from the mixer and as its second input the sound carrier. A lowpass filter coupled between the output of the phase detector and a control input to the VCO completes the PLL. The detected audio information is provided at the output of the lowpass filter.

8 Claims, 1 Drawing Figure

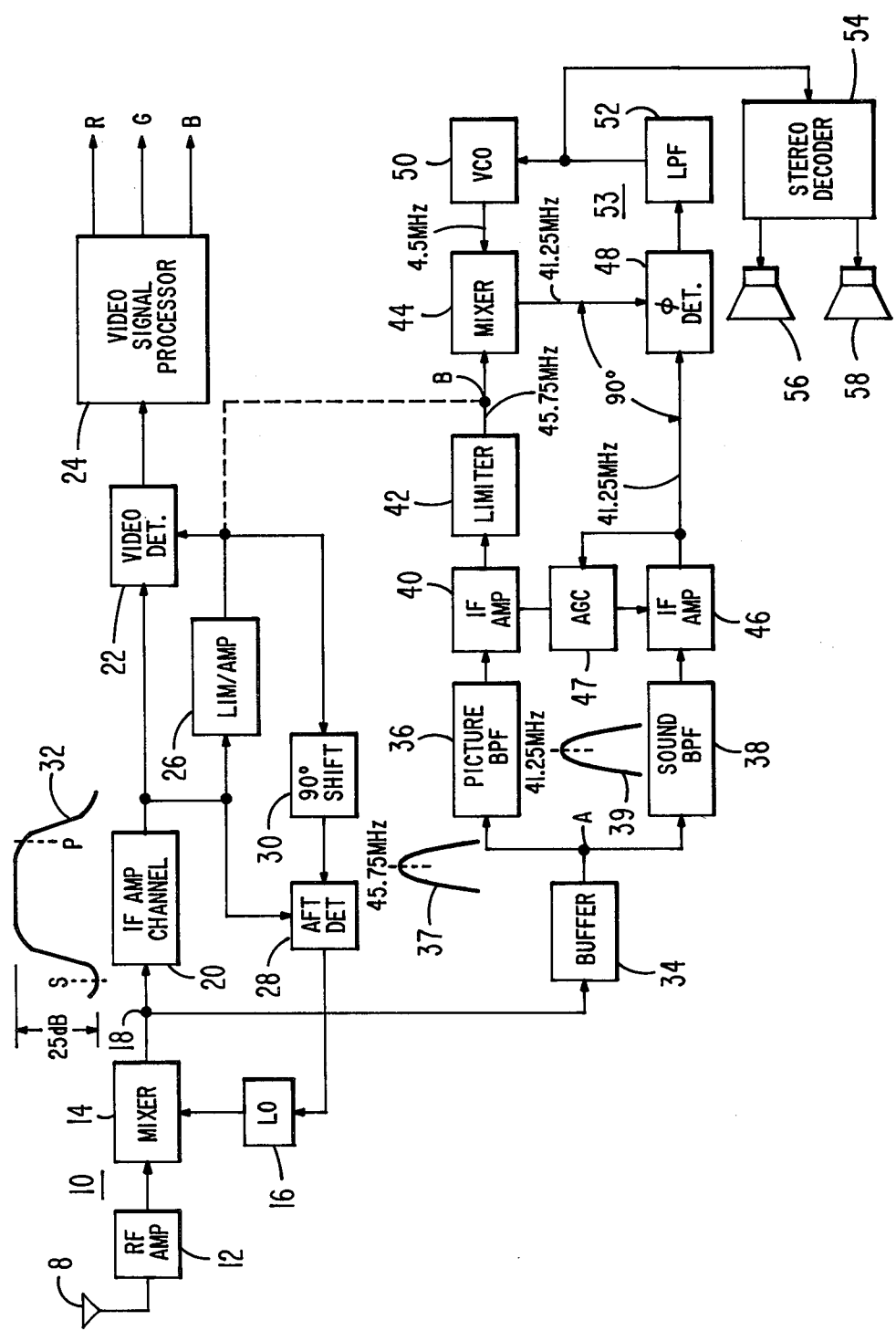

TELEVISION SOUND DETECTION SYSTEM USING A FREQUENCY TRANSLATION PHASE-LOCKED LOOP

The present invention relates to television sound signal processing and, in particular, to a frequency translation phase-locked loop (PLL) for detecting the audio information.

Multichannel audio for stereo and bi-lingual broadcasting involves the use of one or more audio subcarriers, which subcarriers increase the television audio signal bandwidth from 15 kHz to approximately 90 KHz or more. As a result an audio buzz which is produced in the sound signal processing channel tends to be more severe.

Audio buzz, which may be defined as the result of picture-related modulation which is transferred to the audio signal, has always been present to some degree in television signal processing circuitry, but has been kept to within tolerable limits by various circuit techniques.

In the early days of television, the picture and sound signals were processed in separate channels which followed the tuner circuitry. Such separate processing prevents any significant interaction within the receiver of the picture and sound carriers and thus substantially eliminates receiver generated audio buzz. Unfortunately, any frequency variations of the tuner local oscillator due to drift or automatic fine tuning (AFT) are imparted to the intermediate frequency (IF) sound carrier as well as the IF picture carrier and are detected as spurious interference (buzz) by the audio frequency modulation (FM) detector. Additionally, since the sound channel has a much narrower passband than the picture channel passband, the receiver had to be tuned for best sound, not best picture.

Modern day television receivers almost universally use the intercarrier method of sound signal processing. In such method, the picture and sound carriers are processed after the tuner in a common IF channel which includes a particular IF bandpass response which (1) attenuates the sound carrier about 20 db more than the picture carrier and (2) locates the picture carrier 6 db down on the high frequency slope of the IF passband. Thereafter, the greater amplitude picture carrier is processed in the video channel for detecting the video information and, for recovering the audio information, the two IF carriers are mixed to form an intercarrier sound signal having a frequency corresponding to the difference of the carrier IF frequencies. E.g., for the NTSC system a 45.75 MHz picture carrier is mixed with a 41.25 MHz sound carrier to produce a 4.5 MHz intercarrier sound signal. The intercarrier detection method is particularly advantageous due to the fact that common mode FM in the sound and picture carriers (caused, e.g., by tuner local oscillator variations in the receiver itself and in television accessories to which the receiver may be coupled, such as a cable TV converter) is cancelled by the IF signal mixing when the intercarrier sound signal is developed. However, the intercarrier method is not buzz free. Although the above-noted intercarrier IF passband response is necessary for proper detection of the picture carrier, its use tends to substantially increase audio buzz compared to the separate picture and sound channel method by; (1) significantly attenuating the sound carrier and thus reducing the signal-to-noise ratio of the audio signal, and (2) causing unequal IF picture carrier sideband attenuation which imparts an incidential phase modulation (ICPM) to the picture carrier, commonly referred to as "Nyquist ICPM", which distorts the sound signal during intercarrier mixing. Additionally, in the intercarrier system a high degree of modulation or overmodulation of the picture carrier (which is commonly caused by local affiliate stations insertion of picture overlays) can eliminate the picture carrier signal and cause audio buzz at the video line and field rates (i.e., 15,734 Hz and 60 Hz in the NTSC system). The intercarrier buzz problem is discussed further in the article entitled "Intercarrier Buzz Phenomena Analysis and Cure" by P. Fockens and C. G. Eilers in *IEEE Transactions on Consumer Electronics,* August 1981, pages 381–397.

The audio buzz produced by an intercarrier system, although present, can be tolerated in monophonic audio television receivers due to the relatively narrow passband of the sound channel in such receivers. Unfortunately, with the increased audio bandwidth of multichannel audio, the audio buzz is also increased and is no longer within tolerable limits.

A sound detection system has been developed which combines the separate and intercarrier systems and may descriptively be called "split-intercarrier". Such system is described in the forementioned article by P. Fockens and C. G. Eilers. In this system, after the tuner, the picture carrier signal is processed separately from the sound carrier signal for deriving the video information. However, the IF picture and sound carriers are processed together in a sound channel for detecting the audio information in accordance with the above-described intercarrier system. Since in this system the IF filter response necessary for detection of the vestigial sideband video signal is not included in the sound channel, audio buzz due to Nyquist ICPM is substantially eliminated. However, since the intercarrier method is retained, the IF picture and sound carriers are co-processed in the IF amplification channel. Thus, picture-related distortion of the sound signal caused by nonlinear effects within the IF amplifier and the degree of video modulation are two sources of audio buzz peculiar to the intercarrier system which are not eliminated. Furthermore, additional circuitry such as intercarrier amplifiers, tuned circuits and a discriminator are also required.

The present invention is directed to an audio signal detection system which combines the advantages of the separate and intercarrier methods without their individual disadvantages and with minimum circuit complexity. In accordance with the present invention, a system for recovering the audio information from a television signal including intermediate frequency (IF) picture and sound carrier signals comprises a controllable oscillator having a controlled frequency output signal and a frequency translation phased-locked loop (PLL) including a frequency mixer and a phase detector. The mixer has the oscillator output signal as one input and the IF picture carrier signal as the other input. The phase detector has as one input the IF sound signal and the output from the mixer as the other input. A low pass filter coupled between the output of the phase detector and a control input of the oscillator completes the PLL by providing a control signal to the oscillator for controlling the output signal frequency. The detected audio information is provided at the output of the low pass filter.

In the sole FIGURE a television receiver including a sound detection system constructed in accordance with the present invention is shown in block diagram form.

Referring to the drawing, a television broadcast signal received by an antenna 8 is applied to a television tuner 10 which includes a ratio frequency (RF) amplifier 12, a mixer 14 and a local oscillator 16. Tuner 10 selectively translates the RF picture and sound carrier signals of a particular TV channel to intermediate frequency (IF) carriers at 45.75 MHz and 41.25 MHz respectively, in the NTSC system. The IF carriers are available at tuner output terminal 18. The 45.75 MHz IF picture carrier is basically an amplitude modulated signal containing the composite video information. The 41.25 MHz IF sound carrier, on the other hand, is a frequency modulated signal. Conventional color television signal processing circuitry including an IF filtering and amplifying channel 20, a video detector 22 and a video signal processor 24 are responsive to the IF picture carrier at terminal 18 for providing the red (R), green (G) and blue (B) color video signals to a kinescope (not shown) for reproducing a color image of a televised scene. Additionally, a tuned limiter/amplifier stage 26 provides an appropriately filtered, amplified and limited version of the IF picture carrier signal to video detector 22 for the synchronous detection of the composite video signal from the IF picture carrier. The IF picture carrier output of limiter/amplifier 26 is also applied to an automatic fine tuning (AFT) detector 28 via a 90° phase shifting network 30 for providing an AFT control signal at the output of AFT detector 28 which is applied to local oscillator 16. In this manner the frequency and phase of the local oscillator signal applied to mixer 14 tracks the frequency and phase of the received RF picture carrier. The construction and operation of video detector 22, limiter/amplifier 26, AFT detector 28 and phase shifting network 30 is described in greater detail in U.S. Pat. No. 4,263,611 issued Apr. 21, 1981 to W. G. Gibson, et al.

If channel 20 provides a conventional passband response 32 in which the IF picture carrier P is located 6 db down on the higher frequency slope of passband response 32 and the IF sound carrier S is located approximately 25 db down on the lower frequency slope of passband response 32. Thus, the vestigial sideband video information can be detected without significant interference from the IF sound carrier. Unfortunately, IF passband response 32 induces what is called a "Nyquist" incidental carrier phase modulation (ICPM) to the IF picture carrier, due to its asymmetrical attenuation of the sidebands of the IF picture carrier. In the conventional intercarrier sound detection system this Nyquist induced ICPM distortion of the IF picture carrier results in distortion of the intercarrier sound signal due to the process of mixing the IF sound and picture carriers. This distortion of the intercarrier sound signal results in audio buzz. The amount of audio buzz caused by Nyquist ICPM increases in direct relationship with increases in the bandwidth of the audio signal. Thus, when one considers that the bandwidth of a composite audio signal including multiple subcarriers for the transmission of, for example, monophonic, stereophonic and second audio program signals is significantly greater than the bandwidth of the monophonic signal conventionally processed by an intercarrier system, it becomes apparent that the intercarrier method of audio detection is likely to be unsatisfactory since the audio buzz produced will be substantially increased.

In accordance with the present invention the IF sound carrier is processed in a path separate from the IF picture carrier processing circuitry and the composite audio signal is detected by a frequency translation phase-locked loop (PLL) 53. Accordingly, for detecting the audio information, the IF picture and sound carriers provided at terminal 18 are applied to picture and sound bandpass filters 36 and 38 respectively, via a buffer amplifier 34 and a terminal A. Picture bandpass filter 36 has a symmetrical, relatively narrow (e.g. 1 MHz) passband response 37 centered at the IF picture carrier frequency (e.g., 45.75 MHz in the NTSC system) for selecting substantially only the IF picture carrier signal. An IF amplifier 40 and a limiter 42 appropriately amplify and limit the IF picture carrier signal and apply the resultant limited, and therefore substantially unmodulated, IF picture carrier to one input of a frequency mixer 44.

Sound bandpass filter 38 has a symmetrical, relatively narrow (e.g., 1 MHz) passband 39 centered at the IF sound carrier frequency (e.g., 41.25 MHz in the NTSC system) for selecting substantially only the IF sound carrier signal which is applied, after appropriate amplification by an IF amplifier 46, as one input to a phase detector 48. IF amplifiers 40 and 46 may be similarly configured and each comprise, for example, an integrated circuit IF amplifier such as the TA 7607 manufactured by Tokyo Shibaura Electric Co., Ltd. Limiter 42 may simply comprise parallel connected, oppositely poled Schottky-barrier diodes. A conventional automatic gain control circuit 47 (AGC) is responsive to the output of IF amplifier 46 (or alternatively to the output of amplifier 40) for supplying AGC control voltages to IF amplifiers 40 and 46 for controlling their gain so as to establish their output signals at predetermined levels.

A varactor tuned voltage controlled oscillator (VCO) 50 having a nominal oscillation frequency equal to the frequency difference (e.g., 4.5 MHz for the NTSC system) between the IF picture and sound carriers provides a second input to mixer 44. Mixer 44 may comprise for example a double balanced analog multiplier circuit, such as the MC1496 available for Motorola Semiconductor Products, Inc., and operates in a switching mode in response to the amplitude limited IF picture carrier (which acts as the switching control signal) for mixing the IF picture carrier signal and VCO output signal and providing at its output a signal representing the frequency and phase differences between its input signals. The frequency difference between the input signals of mixer 44 is 41.25 MHz. This 41.25 MHz output signal of mixer 44 is supplied as a second input to phase detector 48, which can also comprise an MC1496 integrated circuit. Phase detector 48 provides an output signal having an amplitude which varies in direct relation with the phase difference of its input signals and thus operates as a frequency modulation (FM) demodulator for the FM modulated IF sound carrier coupled to its first input from amplifier 46 and provides at its output a composite baseband audio signal (along with undesired signals which result from the detection process). For a more detailed discussion of the operation of analog multipliers as FM demodulators see an article entitled "Applications of a Monolithic Analog Multiplier" by A. Bilotti, in *IEEE Journal of Solid State Circuits,* Dec. 1968, pages 373-380.

A low pass filter 52 coupled to the output of phase detector 48 filters its output signal to provide a control signal for controlling the frequency of VCO 50. Mixer 44, phase detector 48, VCO 50 and low pass filter 52 comprise the frequency translation phase-locked loop 53. Low pass filter 52 has a sufficient bandwidth for selecting the composite baseband audio signal (while rejecting the higher frequency undesired signals) and supplying the composite audio signal, for example, to a stereo decoder 54. If stereo programming is provided in the composite audio signal, decoder 54 will decode the composite audio signal and provide left and right stereo signals to speakers 56 and 58, respectively. If stereo programming is not provided decoder 54 will provide the monophonic signal to the speakers.

In operation, mixer 44 frequency translates the the IF picture carrier signal applied at its input and provides an output signal having a frequency corresponding to the difference of the frequencies of its input signals (e.g., 41.25 MHz). Undesired output signals corresponding to feedthrough of the input signals and the sum of the input signals are attenuated by the relatively narrow bandwidth of lowpass filter 52. The amplitude of the output voltage of phase detector 48 is a measure of the phase difference between its input signals. This output voltage is filtered and applied by low pass filter 52 as a control voltage to VCO 50. The output frequency of VCO 50, and consequently the 41.25 MHz translated signal from mixer 44, changes in direct relation to the amplitude of the control voltage and is in a direction for reducing the phase difference between the signals at the inputs of phase detector 48. When the phase of the input signals of detector 48 are in quadrature (90°), minimum amplitude control voltage is applied to VCO 50. Therefore, due to the feedback nature of loop 53, when it is locked, the control voltage at the output of filter 52 corresponds to the audio information, and is such that the frequency of the translated difference signal at the output of mixer 44 is equal to the average frequency of the IF sound carrier and its phase is in quadrature in relation to the phase of IF sound carrier. Thus, phase detector 48 acts as an FM detector for frequency demodulating the IF sound carrier. Additionally, the common mode FM which may be imparted to both the picture and sound carriers by, for example, the tuner local oscillator 16 or television accessories such as a cable television converter which may precede the tuner 10, is transferred to the translated difference signal and therefore cancelled in phase detector 48.

The present sound detection system is advantageous because use is made of the predetermined frequency spacing between the IF picture and sound carriers for allowing simplified receiver tuning and, any common mode FM of the IF carrier is cancelled. Furthermore, Nyquist ICPM of the picture carrier due to the upper slope of the IF passband does not produce audio buzz in the present detection system. More specifically, the picture and sound processing channels are separated immediately after tuner 10. In the sound processing channel, picture bandpass filter 36 symmetrically attenuates the sidebands of the IF picture carrier and therefore eliminates the "Nyquist" type of audio buzz. Furthermore, bandpass filter response 37 is narrowband enough to substantially attenuate components of the video signal which are at frequencies corresponding to second and third subharmonics of 4.5 MHz (e.g., 2.25 MHz and 1.5 MHz, respectively, from the 45.75 MHz IF picture carrier in the NTSC system). Since the frequency of the output signal of VCO 50 is also at 4.5 MHz, audio frequency zero beats are prevented from being generated at the output of mixer 44. Consequently a further source of picture-related audio buzz which is inherent in the intercarrier detection system is substantially eliminated.

Additionally, by comparison with the intercarrier system in which the IF channel passband imparts approximately 25 db of attentuation to the IF sound carrier, so that the signal-to-noise in the audio channel is adversely affected, in the system of the present invention, sound bandpass filter 38 provides the IF sound carrier to IF amplifier 46 relatively unattenuated. Thus, the amplitude level of the sound carrier is approximately 25 db greater than in the intercarrier system and the signal-to-noise level of the detected audio signal is accordingly improved for a given RF signal level.

Additionally, it should be noted that since an intercarrier sound signal is not generated, there is no need for an intercarrier amplifier, an intercarrier discriminator or their associated tuned circuits.

It should be noted that the amplitude levels of input signals to mixer 44 and phase detector 48 are such that their input devices are primarily responsive to frequency and phase of the input signals. Thus, an inherent AM rejection of the IF picture carrier modulation is obtained. Furthermore, although a sum frequency signal (i.e., 82.5 MHz) is also provided at the output of phase detector 48, its modulation envelope is substantially symmetrical and thus has an insignificant effect at the audio baseband frequencies. Therefore, the limiting action of limiter 42 need not be as great as that required in an intercarrier system. This lesser degree of limiting further reduces; (1) the possibility of picture-related line and field rate audio buzz caused by a high degree of modulation of the IF picture carrier and; (2) the generation of harmonics, which can mix with the output of VCO 50 and generate distortion in the audio frequency band.

In another embodiment, the IF picture carrier at the output of limiter/ amplifier 26 can be coupled to mixer 44 at point B and thereby be used as its switching signal input. The circuitry between the points A and B can be eliminated. However, since IF amplification channel 20 is included in the sound detection system, the Nyquist induced ICPM is not eliminated and this embodiment may not be acceptable for detecting a wide bandwidth composite audio signal. However, since the IF sound carrier is produced with relatively little attenuation, there still remains a substantial signal-to-noise improvement when detecting relatively narrow bandwidth audio signals such as, for example, a monophonic audio signal.

While separate IF amplifiers 40 and 46 are used in the embodiment shown in the FIGURE, a common IF amplifier can be used for amplifying the IF picture and sound carrier signals provided at the output of buffer 34, such as described in copending U.S. patent application Ser. No. 412,898 entitled "Frequency Translation Phase-Locked Loop Sound Detection System Utilizing a Single IF Amplifier" filed concurrently with the present application in name of P. D. Griffis and assigned, like the present application, to RCA Corporation. Finally, it should be clear that the NTSC frequencies mentioned herein are merely illustrative and can be appropriately scaled for operation at other frequencies in the NTSC, PAL or SECAM television systems.

What is claimed is:

1. In a television system including a source of an intermediate frequency (IF) signal including picture and sound carriers modulated with video and audio information, respectively, apparatus for detecting the audio information comprising:
- a controllable oscillator responsive to a control signal coupled to a control input and having an output at which is provided a controlled frequency output signal;
- means having first and second inputs and an output for providing a frequency translated signal, said first input coupled to be responsive to said picture carrier and said second input coupled to be responsive to said oscillator output signal;
- a phase detector having first and second inputs and an output, said first input coupled to be responsive to said sound carrier and said second input coupled to be responsive to said frequency translated signal; and
- low pass filter means having an input coupled to the output of said phase detector and having an output for providing said control signal to the control input of said controllable oscillator and for providing said audio information.

2. The apparatus of claim 1 wherein said controlled frequency output signal has a nominal frequency equal to the frequency difference between said picture and sound carrier and said means for providing a frequency translated signal comprises a mixer having a first input coupled to receive said picture carrier, a second input coupled to receive said oscillator output signal and an output for providing said frequency translated signal at a nominal frequency equal to the frequency of said sound carrier.

3. The apparatus of claim 2 further including amplifier means responsive to said picture carrier for applying a substantially unmodulated picture carrier to said mixer.

4. The apparatus of claim 3 further including
- a first filter network having a symmetrical passband centered at the sound carrier frequency, having an input coupled to receive said IF signal and an output; and
- a first IF amplifier coupled between the output of said first filter network and the first input of said phase detector.

5. The apparatus of claim 4 wherein said amplifier means comprises:
- a second filter network having a symmetrical passband centered at the picture carrier frequency, having an input coupled to receive said IF signal and an output; and
- a second IF amplifier coupled between the output of said second filter network and the first input of said mixer.

6. The apparatus of claim 5 further including an amplitude limiter coupled between the output of said second IF amplifier and the first input of said mixer.

7. Apparatus in accordance with claim 1, 2 or 6 wherein said audio information includes a plurality of audio channels and further includes:
- a multichannel decoder circuit having an input coupled to the output of said lowpass filter and an output for providing one or more of said plurality of audio channels.

8. Apparatus in accordance with claim 2 wherein said mixer and said phase detector comprise double balanced analog multipliers.

* * * * *